Aug. 31, 1937.  C. A. B. HALVORSON  2,091,851
ELECTRIC CORD SET
Filed May 26, 1933
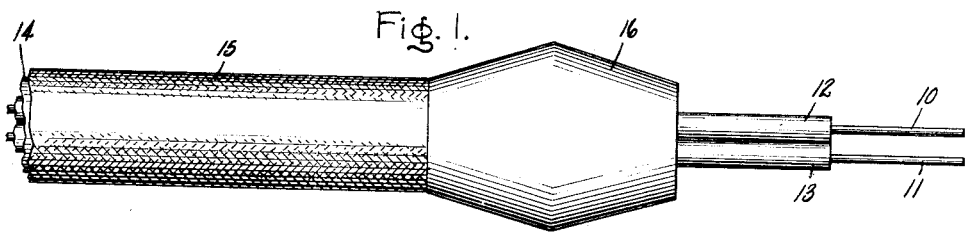
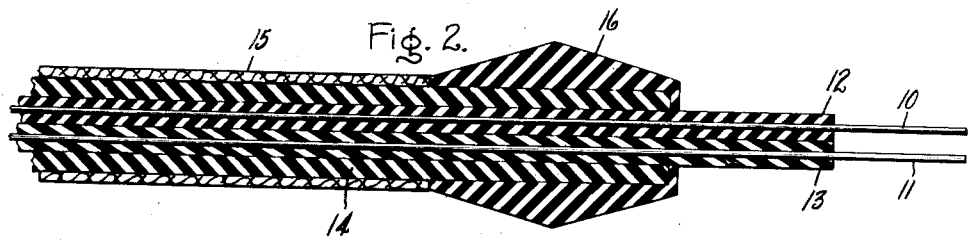
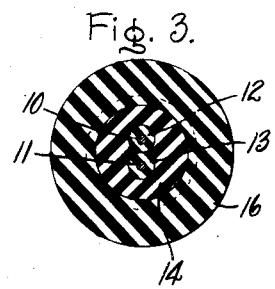
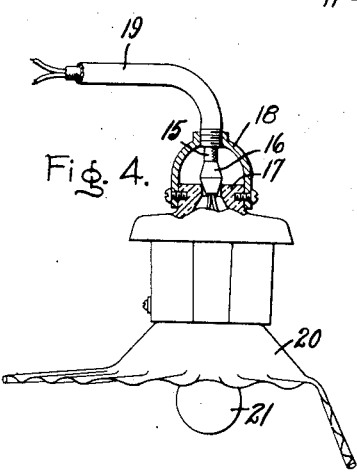
Inventor:
Cromwell A. B. Halvorson,
by Harry E. Dunham
His Attorney.

Patented Aug. 31, 1937

2,091,851

UNITED STATES PATENT OFFICE 2,091,851

ELECTRIC CORD SET

Cromwell A. B. Halvorson, Lynn, Mass., assignor to General Electric Company, a corporation of New York Application May 26, 1933, Serial No. 673,069

1 Claim. (Cl. 173—324)

My invention relates to an electric cord set and more particularly to a cord set for use in connecting a lighting unit to power supply lines.

It is a common practice to connect a number of street lights in series and maintain a constant current regardless of the voltage of the circuit in which the lighting units are connected. The cable connecting the lighting units in this circuit requires relatively little insulation on the conductors because of the low voltage drop in the lighting unit but requires considerably greater insulation on the combined conductors to protect them from the voltage drop to ground which may be relatively high. In general, the voltage drop in the lighting unit is less than 100 volts so that an insulation which will protect the conductors up to 600 volts will give ample protection with a large safety factor. However, the maximum voltage to which the cable may be subjected is the voltage of the transformer secondary on open circuit which may be as high as 3000 or 4000 volts. Obviously, the insulation on the conductors which protects them up to 600 volts is wholly inadequate and additional overall insulation must be provided which will protect the conductors for a voltage of 5000 volts in order to give ample protection and a factor of safety for the maximum voltage to which the cable may be subjected. However, difficulty has been experienced even when the cable is provided with an overall insulation to protect it for 5000 volts due to careless installation. The lighting unit which is internally wired may have metal parts. It is necessary to remove the overall insulation to separate the conductors in order to connect them to the lighting unit. If an excess of this overall insulation is removed and one of the conductors is adjacent to this metal part of the lighting unit then this insulation protecting these conductors to ground is reduced at this point from 5000 to 600 volts. This may result in a breakdown of the insulation at this point and also may result in injury to anyone coming in contact with the metal part of the lighting unit which may be connected to one of the conductors by the break-down of this insulation.

The object of my invention is to provide a cord set which will provide adequate insulation to the point of connection of the cable to the lighting unit. A further object of my invention is to provide a cable which will provide the above protection and which will be easy to install.

What I consider to be novel and my invention will be better understood by reference to the following specification and appended claim when considered in connection with the accompanying drawing. In the drawing, Fig. 1 is a plan view of my improved cable; Fig. 2 is a longitudinal sectional view; Fig. 3 is a cross sectional view, and Fig. 4 is a view partly in section of my improved cable connected to a lighting unit.

Referring to the drawing 10 and 11 indicate copper conductors. The conductors are provided with individual insulations 12 and 13 of rubber of sufficient thickness to provide the necessary insulation to protect the conductors from the voltage drop in the lighting unit to which the cable is to be connected. An overall rubber jacket 14 is provided over these two conductors. This jacket 14 is of greater thickness than the insulations 12 and 13 to provide an insulation for the cable for a voltage very much greater than the voltage for which the individual conductors are protected. This insulation for a high voltage is necessary, as pointed out above, as it is customary to connect the lighting units in series so the voltage drop of the conductors at the point of their connection to the lighting unit may be relatively low but the voltage to ground may be considerably higher. The insulations 12 and 13 and the jacket 14 are of rubber in order to provide a high resistance to atmospheric conditions especially to make the cable waterproof. Over the rubber jacket 14 a cotton braid 15 is provided which may be impregnated with a flameproof material. To insure the continuation of the overall insulation over the conductors to the point where it is necessary for the conductors to be separated in order to be connected to the lighting unit a molded rubber plug 16 is provided. The braid 15 is removed from the overall rubber jacket 14 and the plug 16 is molded directly in position on the overall rubber jacket 14 and extends a little beyond the end of the overall rubber jacket 14. The plug is of circular cross section and increases in diameter from the two ends to the center. This wedge shape makes it convenient for forcing the plug into an opening in a porcelain insulator 17 as shown in Fig. 4. The porcelain 17 is secured to a metal cup 18 which is mounted on a tube or pipe 19 which is suspended from a pole not shown on the drawing. By placing the molded rubber plug 16 in the opening of the porcelain 17 adequate insulation is insured for the two conductors where they might come into physical contact with metal parts. The individual conductors are protected by the porcelain through which the conductors pass at their point of connection to the lighting unit. It may be seen that if the plug 16 were not provided and more of the overall rubber jacket 14 were removed than necessary, it is quite possible that the separate conductors might be in close proximity to the metal cap 18 or the metal tube 19. In such a case the insulation on the conductors would only serve to protect them from a voltage to ground corresponding to the insulation on the individual conductors. As pointed out above, this insulation is only sufficient to protect the conductors for the normal voltage drop in the line. Also, the rubber plug 16 secures the outer rubber jacket firmly to the conductors so that there is no danger of the jacket fraying back from the point at which it has been removed from the conductors and consequently causing a hazard in use which was not originally present. As shown in Fig. 4 a reflector 20 is provided for the lamp 21. It is to be understood that the invention is not restricted to the use of this cable for this particular type of lighting unit but is adapted for use with any type of lighting unit with internal wiring or for any other use to which it may be found suited. It may be preferable in some instances to force the plug into the end of tube 19 especially in cases where the porcelain is adjacent to the opening of the tube or supported directly thereon. The cable is assembled in position by threading it back from the opening of tube 19 adjacent to the metal cap 18. The other end of the cable is adapted for connection to the power supply of the lighting unit. It is also to be noted that the plug 16 when tightly forced into the opening of porcelain 17 prevents the passage of moisture or insects through tube 19 into the unit where a closed lighting unit is used which might damage or impair its operation.

From the foregoing, it will be seen that an improved cord set is provided which is thoroughly protected against the hazard of a reduction in the insulation on the cable which is designed to protect it against breakdown by careless installation. In addition it is easy to install.

What I claim as new and desire to secure by Letters Patent in the United States is:

In combination, a lighting unit having an opening for the passage of conductors and a cable comprising a plurality of electric conductors, rubber insulation for each conductor, an overall rubber insulation for the combined conductors extending a portion of their length and a molded rubber plug of increasing diameter from the two ends to the center extending beyond and covering the overall rubber insulation and adapted to close the opening of said lighting unit to prevent the entrance of moisture and deleterious material into said lighting unit.

CROMWELL A. B. HALVORSON.